Patented May 14, 1940

2,200,445

UNITED STATES PATENT OFFICE 2,200,445

AZO DYESTUFFS CONTAINING A HEAVY METAL IN A COMPLEX FORM

Ernst Fellmer, Leverkusen-I. G. Werk, Germany, assignor to General Aniline & Film Corporation, a corporation of Delaware No Drawing. Application March 4, 1938, Serial No. 193,854. In Germany November 25, 1933

3 Claims. (Cl. 260—145)

The present invention relates to new azo dyestuffs containing a heavy metal in a complex form, more particularly it relates to azo dyestuffs which may be represented by the following general formula:

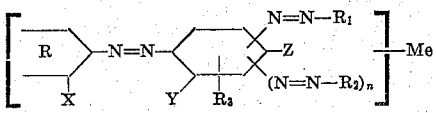

wherein X stands for the hydroxy or carboxylic acid group, Y stands for the hydroxy, the amino or a substituted amino group and Z means the same as Y, wherein R means a radical of the benzene or naphthalene series, $R_1$ and $R_2$ stand for radicals of diazotization components suitable for producing azo dyestuffs, $n$ stands for one of the numbers 1 and 0, $R_3$ stands for hydrogen, hydroxyl, alkyl, halogen, —COOH or —$SO_3H$ and Me means a metal of the atomic number 24–28 inclusive.

My new dyestuffs are obtainable by starting with a mono-azo dysestuff of the general formula:

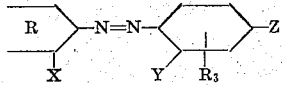

wherein X stands for hydroxyl, alkoxy or the carboxylic acid group, Y, Z, R and $R_3$ mean the same as stated above, coupling the same with a diazo compound suitable for preparing azo dyestuffs, if desired, coupling with a further diazo compound suitable for preparing azo dyestuffs and transforming the dyestuffs into metal complex compounds of the corresponding o-hydroxy or o-carboxy azo dyestuffs. This transformation into the metal complex compounds may be performed according to known methods either in the final dyestuffs or in an intermediate stage of the dyestuff preparation, either in an acid, neutral or an alkaline medium, and, if necessary, under pressure. It is selfunderstood that in case there are used as starting compounds such azo dyestuffs of the above identified second formula, in which X stands for alkoxy the conditions of working must be chosen in such a manner that the alkoxy group is split up in the manufacture of the heavy metal complex compounds. Besides the manufacture of the new dyestuffs may be carried out in a different order as for instance by coupling the diazo component bearing the lake-forming group only in the second place with the azo component. Occasionally by such variations differing shades may be obtained.

The new metal containing dyestuffs are in form of their alkali metal salts generally dark, watersoluble powders, dyeing leather generally even shades of excellent fastness to light. The dyestuffs are in general suitable for dyeing the different kinds of leather such as chromium and vegetable tanned leather and also glacé leather. Further my new heavy metal compounds can be suitable for dyeing animal and vegetable fibers.

The present invention is a continuation in part of my copending application Ser. No. 753,785, filed November 19, 1934, now Patent No. 2,111,559, issued March 22, 1938.

The invention is illustrated by the following examples without being restricted thereto, the parts being by weight:

Example 1

The diazo compound prepared from 15.4 parts of 4-nitro-2-amino-1-hydroxybenzene is coupled in an alkaline medium with 11 parts of 1.3-dihydroxybenzene. After the coupling is complete the monoazo dyestuff is isolated, again stirred into water and coupled with the diazo compound prepared from 20.1 parts of 4-amino-1.3-dimethylbenzene-6-sulfonic acid in an alkaline medium. The dyestuff is isolated in the usual way. In order to convert it into the chromium complex compound it is boiled for several hours with an aqueous chromium sulfate solution acid to litmus corresponding to 10.3 parts of $Cr_2O_3$, made alkaline and clarified and finally isolated in the usual manner. The dyestuff corresponds in the free state, i. e. in the form of the free acid, to the following formula:

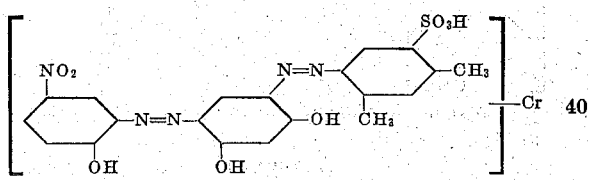

and dyes leather dark brown shades.

Example 2

The diazo compound prepared from 23.4 parts of 4-nitro-2-amino-1-hydroxybenzene-6-sulfonic acid is combined with a soda alkaline solution prepared from 10.8 parts of 1.3-diaminobenzene. After the coupling is complete the mono azo dyestuff is coupled with the diazo compound prepared from 21.8 parts of 1-amino-2-nitrobenzene-4-sulfonic acid in a soda-alkaline medium. The disazodyestuff is isolated by acidifying the solution and adding salt. In order to convert it into the chromium complex compound it is boiled for several hours with aqueous chromium sulfate solution acid to litmus corresponding to 14 parts of $Cr_2O_3$, made alkaline and clarified and finally separated in the usual manner. The chromium containing dyestuff thus obtained, which corresponds in the free state, i. e. in the form of the free acid, to the following formula:

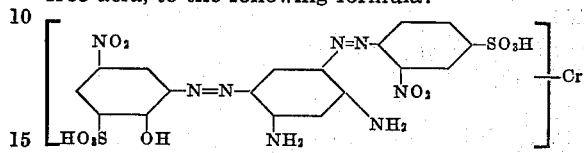

dyes leather dark brown shades.

*Example 3*

The diazo compound prepared from 28.4 parts of 6-nitro-1-amino-2-naphthol-4-sulfonic acid is coupled in an alkaline medium with 11 parts of resorcinol, and the monoazo dyestuff is isolated by acidifying the solution and adding salt. The dyestuff is then transformed into its chromium complex compound by refluxing for several hours with aqueous chromium sulfate solution corresponding to 15 parts of $Cr_2O_3$. The chromium lake is then coupled in a soda-alkaline medium with the diazo compound prepared from 22.3 parts of naphthionic acid. The dyestuff having in its free state, i. e. in the form of the free acid, the following formula:

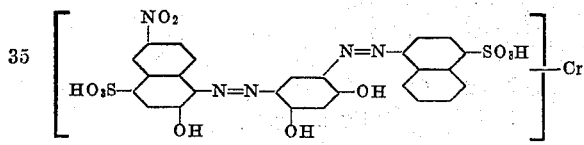

dyes leather grey to greyish-black shades.

*Example 4*

The monoazo dyestuff obtained by coupling in an acid medium the diazo compound prepared from 13.7 parts of anthranilic acid with 10.9 parts of m-aminophenol, is heated for 1½ hours at 110° C. in an autoclave with a chromium formate solution corresponding to 8 parts of $Cr_2O_3$. The dyestuff is isolated from the acidified reaction mixture and coupled in an alkaline solution with the diazo compound prepared from 21.8 parts of p-nitraniline-3-sulfonic acid. The dyestuff having in its free state, i. e. in the form of the free acid, the following formula:

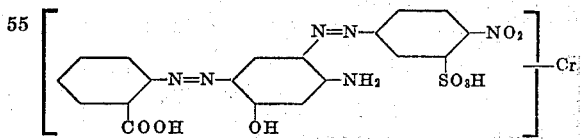

dyes leather yellowish-red light to middle brown shades.

*Example 5*

The monoazo dyestuff obtained by coupling the diazo compound prepared from 18.9 parts of 2-amino-1-hydroxybenzene-4-sulfonic acid with 10.8 parts of 1.3-diaminobenzene, is stirred into water and coupled in a soda-alkaline medium with the diazo compound prepared from 22.3 parts of 1-aminonaphthalene-4-sulfonic acid and, when this coupling is complete, with the diazo compound prepared from 13.8 parts of 1-amino-4-nitrobenzene. By boiling the dyestuff for several hours with an aqueous solution containing 25 parts of cobaltous sulfate at neutral or weakly acid reaction the cobalt complex compound of the trisazo dyestuff is obtained, which is worked up and separated in the usual manner. The cobalt containing dyestuff which corresponds in its free state, i. e. in the form of the free acid, to the following formula:

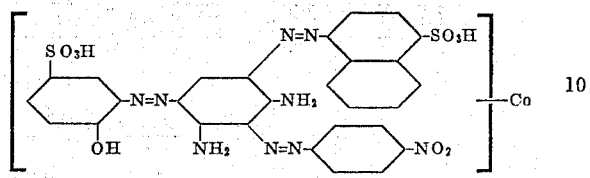

dyes leather black-brown shades.

*Example 6*

The sodium hydroxide alkaline solution prepared from 11 parts of 1.3-dihydroxybenzene is coupled with the diazo compound prepared from 28.4 parts of 6-nitro-1-amino-2-hydroxy-naphthalene-4-sulfonic acid. The monoazo dyestuff salted out and isolated is then coupled in sodium hydroxide alkaline, concentrate solution with the diazo compound prepared from 14.3 parts of 4-chloro-2-amino-1-hydroxybenzene and, when the coupling is complete, salted out and separated. In order to transform the dyestuff into the double metal complex compound it is boiled for several hours with an aqueous chromium sulfate solution acid to litmus corresponding to 18.7 parts of $Cr_2O_3$, made alkaline and clarified and finally isolated in the usual manner. The dyestuff which corresponds in its free state, i. e. in the form of the free acid, to the following formula:

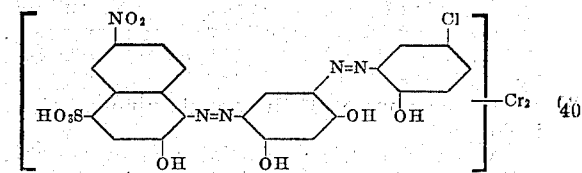

dyes leather grey to black shades.

*Example 7*

10.8 parts of 1.3-diaminobenzene are coupled in weakly soda-alkaline solution with the diazo compound prepared from 23.4 parts of 6-nitro-2-amino-1-hydroxybenzene-4-sulfonic acid. The separated monoazo dyestuff which is again stirred into water is then coupled in a soda-alkaline medium with the diazo compound prepared from 22.3 parts of 2-aminonaphthalene-6-sulfonic acid; the diazo dyestuff thus obtained is then transformed into its chromium complex compound by refluxing for several hours with a weakly acid chromium formate or chromium sulfate solution corresponding to 10.3 parts of $Cr_2O_3$, made alkaline and clarified and finally worked up in the usual manner. The chromium complex compound of the dyestuff thus obtained corresponds in its free state, i. e. in the form of the free acid, to the following formula:

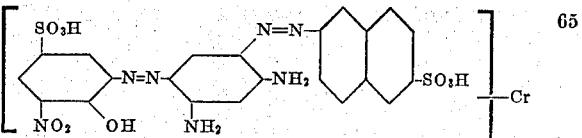

and dyes leather deep dark-brown shades.

*Example 8*

The diazo compound prepared from 19.9 parts of 4.6-dinitro-2-amino-1-hydroxybenzene is coupled in an alkaline medium with 11 parts of 1.3-dihydroxybenzene. The isolated dyestuff is combined in the presence of caustic soda lye with the diazo compound prepared from 23.4 parts of 4-nitro-2-amino-1-hydroxybenzene-6-sulfonic acid. When the coupling is complete, the dyestuff is isolated in the usual way and, in order to convert it into the double iron complex compound, boiled for several hours with a neutral or weakly acid solution containing 29.2 parts of ferric chloride. The dyestuff solution is made alkaline and clarified, and isolated in the usual manner; it corresponds in its free state, i. e. in the form of the free acid, to the following formula:

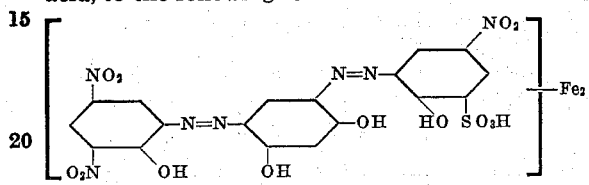

and dyes leather slight olive-dark-brown (nigger-brown) shades.

*Example 9*

The diazo compound prepared from 46.8 parts of 4-nitro-2-aminophenol-6-sulfonic acid is coupled with 10.8 parts of 1.3-diaminobenzene, the coupling mixture being rendered alkaline in order to complete the coupling. The diazo dyestuff is isolated from the acidified solution and transformed into the double chromium complex compound by suspending in water and refluxing for several hours with an aqueous chromium sulfate solution in a quantity corresponding to 16 parts of $Cr_2O_3$. The chromium complex compound is freed from the excess chromium sulfate solution or chromium oxide hydrate respectively, and the reaction mixture is worked up in the usual manner. The dyestuff having in the free state, i. e. in the form of the free acid, the following formula:

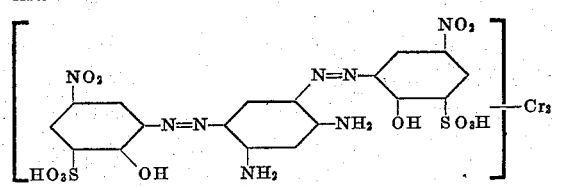

dyes leather, and especially glacé leather, deep blackish-brown shades.

Further examples illustrating the invention are stated in the following table:

| Diazo component bearing the lake-forming group (R) | Azo component | First diazo component (R₁) | Second diazo component (R₂) | Metal | Shades on leather |
|---|---|---|---|---|---|
| 2-aminophenol-4-sulfonic acid. | m-Phenylene-diamine | p-Chloroaniline | | Chromium | Dark brown. |
| 1.2-aminonaphtol-4-sulfonic acid. | m-Aminophenol | 2-toluidine-5-sulfonic acid. | | do | Greenish-grey. |
| 2-aminophenol | Resorcinol | 2-naphthylamine-6.8-disulfonic acid. | | do | Reddish-brown. |
| 4-nitro-2-aminophenol | do | Dehydrothiotoluidine disulfonic acid. | | do | Middle brown. |
| 6-nitro-2-aminophenol-4-sulfonic acid. | m-Phenylene-diamine | 2-naphthylamine-6-sulfonic acid. | | Nickel | Brown. |
| 4-nitro-2-aminophenol | Resorcinol | 4-chloroaniline-2-sulfonic acid. | o-Nitraniline-sulfonic acid. | Chromium | Do. |
| 6-nitro-2-aminophenol-4-sulfonic acid. | do | 2-naphthylamine-6-sulfonic acid. | p-Nitraniline | Iron | Do. |
| Picramic acid | do | Naphthionic acid | 1-naphthylamine-5-sulfonic acid. | Nickel | Red-brown. |
| Do | do | do | do | Manganese | Brown. |
| 4-nitro-2-aminophenol | do | Aminoazobenzene-disulfonic acid. | | Chromium | Red-brown. |
| 1.2-aminonaphtol-4-sulfonic acid. | m-Aminophenol | 4-amino-3.2'-dimethyl-1.1'-azobenzene-4'-sulfonic acid. | | Cobalt | Deep dark-brown. |
| 2-aminophenol-4-sulfonic acid. | do | [α-naphthylamine ← aniline-2.5-disulfonic acid]. | | Iron | Slightly olivish-brown. |
| 1.2-aminonaphtol-4-sulfonic acid. | do | Naphthionic acid | p-nitraniline | Chromium | Olivish dark-brown. |
| 2-aminophenol-4-sulfonic acid. | do | 2-nitraniline-4-sulfonic acid. | 4-aminoazobenzene-sulfonic acid. | Iron | Middle brown. |
| 1.2-aminonaphtol-4-sulfonic acid. | do | 4-nitro-2-aminophenol-6-sulfonic acid. | | Iron (twice) | Brown. |
| Do | Resorcinol | Picramic acid | | Chromium (twice) | Grey to black. |
| Do | do | do | | Manganese (twice) | Dark-grey. |
| 6-nitro-1.2-aminonaphtol-4-sulfonic acid. | do | 4-chloro-2-aminophenol | o-Nitraniline-sulfonic acid. | Chromium (twice) | Greenish-grey. |
| Picramic acid | do | 4-amino-3.2'-dimethyl-1.1'-azobenzene-4'-sulfonic acid. | 4-amino-3.2'-dimethyl-1.1'-azobenzene-4'-sulfonic acid. | Nickel | Red-brown. |
| 4-nitro-2-aminophenol-6-sulfonic acid. | 4-chloro-1.3-diaminobenzene. | o-Nitraniline | | Chromium | Brown. |
| Anthranilic acid | 2-dimethylamino-4-hydroxy-1-methyl-benzene. | 1-naphthylamine-3.6-disulfonic acid. | | do | Reddish light-brown. |
| 6-chloro-2-aminophenol-4-sulfonic acid. | 2-p-toluenesulfamino-4-hydroxy-1-methyl-benzene. | Sulfanilic acid | | do | Yellowish brown. |
| 5-nitro-2-aminophenol | 1.3.5-trihydroxy-benzene. | Naphthionic acid | p-Nitraniline | do | Black-brown. |
| Do | do | do | do | Iron | Dark brown. |
| Do | 1.3-dihydroxybenzene-4-carboxylic acid. | 1-naphthylamine-5-sulfonic acid. | | do | Brown. |
| Anthranilic acid | Resorcinol | p-Sulfanilic acid | p-Nitranilinesulfonic acid. | do | Light brown. |
| 6-chloro-2-aminophenol-4-sulfonic acid. | do | Dehydrothiotoluidine-sulfonic acid. | | Chromium | Brown. |
| 4-nitro-2-aminophenol | do | 2-naphthylamine-6-sulfonic acid. | | Iron | Olive-brown. |
| Do | do | 3-amino-5-sulfo-2-hydroxybenzoic acid. | | Nickel (twice) | Brown. |
| Picramic acid | m-Phenylenediamine | 2-naphthylamine-6.8-disulfonic acid. | | Chromium | Dark brown. |
| 4-nitro-2-aminophenol | do | 4-nitro-2-aminophenol-6-sulfonic acid. | | Chromium iron (twice) | Do. |
| Do | do | 4-nitro-2-aminophenol-6-sulfonic acid. | Naphthionic acid | Chromium (twice) | Do. |

| Diazo component bearing the lake-forming group (R) | Azo component | First diazo component (R₁) | Second diazo component (R₂) | Metal | Shades on leather |
|---|---|---|---|---|---|
| 6-nitro-2-aminophenol-4-sulfonic acid. | m-Phenylenediamine. | [1-amino-8-hydroxy-naphthalene-3.6-disulfonic acid ← p-nitraniline]. | p-Nitraniline. | Chromium. | Dark brown. |
| Do. | 2.4-diamino-1-methylbenzene. | 2′-nitro-4-aminodiphenylamino-4′-sulfonic acid. | | do. | Do. |
| Do. | do. | 4-nitro-2-aminophenol. | | Iron (twice). | Brown. |
| 4-nitro-2-aminophenol. | 3.5-diaminobenzene-1-carboxylic acid. | 4-nitraniline-2-sulfonic acid. | | Iron. | Do. |
| Do. | do. | Sulfanilic acid. | | Chromium. | Olive-brown. |
| Picramic acid. | 1.3-diaminobenzene-4-sulfonic acid. | Dehydrothiotoluidine sulfonic acid. | | do. | Brown. |
| 4-nitro-2-aminophenol-6-sulfonic acid. | Resorcinol. | 4-nitro-2-aminophenol-6-sulfonic acid. | | Cobalt (twice). | Red-brown. |
| Do. | do. | do. | 4-amino-3.2-dimethyl-1.1′-azobenzene-4′-sulfonic acid. | Chromium (twice) | Do. |
| 6-nitro-2-aminophenol-4-sulfonic acid. | do. | Anthranilic acid. | 2-toluidine-5-sulfonic acid. | Chromium (twice) | Reddish-brown. |
| 4-nitro-2-aminophenol. | do. | 4-nitro-2-aminophenol-6-sulfonic acid. | | Chromium iron (twice). | Dark brown. |
| Picramic acid. | do. | 2-aminophenol-4.6-disulfonic acid. | | Iron (twice). | Olive dark brown. |
| Do. | do. | 4-nitro-2-aminophenol-6-sulfonic acid. | | Chromium (twice) | Dark red-brown. |

I claim:

1. Azo dyestuffs containing metal in a complex form of the general formula:

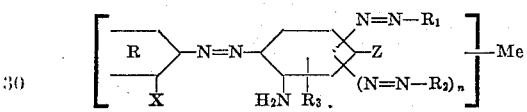

wherein X stands for a member of the group consisting of the hydroxy and the carboxylic acid group, Z stands for a member of the group consisting of the hydroxy, amino and a substituted amino group, R means a member of the group consisting of radicals of the benzene and naphthalene series, R₁ and R₂ stand for radicals of diazotization components suitable for producing azo dyestuffs, $n$ stands for one of the numbers 1 and 0, R₃ stands for a member of the group consisting of hydrogen, hydroxyl, alkyl, halogen, —COOH and —SO₃H and Me means a metal of the atomic number 24–28 inclusive, being in form of their alkali metal salts generally dark, watersoluble powders dyeing leather generally even shades of excellent fastness to light.

2. Azo dyestuffs containing metal in a complex form of the general formula:

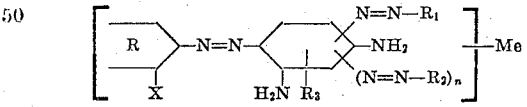

wherein X stands for a member of the group consisting of the hydroxy and the carboxylic acid group, R means a member of the group consisting of radicals of the benzene and naphthalene series, R₁ and R₂ stand for radicals of diazotization components suitable for producing azo dyestuffs, $n$ stands for one of the numbers 1 and 0, R₃ stands for a member of the group consisting of hydrogen, hydroxyl, alkyl, halogen, —COOH and —SO₃H and Me means a metal of the atomic number 24–28 inclusive, being in form of their alkali metal salts generally dark, watersoluble powders, dyeing leather generally even shades of excellent fastness to light.

3. The azo dyestuff corresponding in the form of its free acid to the following formula:

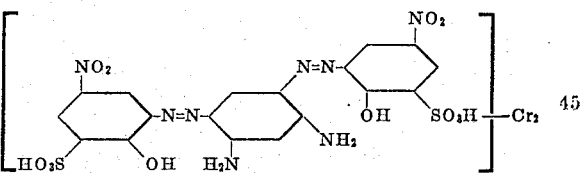

dyeing leather, especially glacé leather deep blackish brown shades.

ERNST FELLMER.